(12) United States Patent
Suchen et al.

(10) Patent No.: US 8,988,163 B2
(45) Date of Patent: Mar. 24, 2015

(54) RADIO-FREQUENCY TRANSCEIVER DEVICE IN WIRELESS COMMUNICATION SYSTEM

(71) Applicant: Wistron NeWeb Corporation, Hsinchu (TW)

(72) Inventors: Hung-Ju Suchen, Hsinchu (TW); Chih-Jung Lin, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 203 days.

(21) Appl. No.: 13/851,110

(22) Filed: Mar. 27, 2013

(65) Prior Publication Data

US 2014/0098722 A1    Apr. 10, 2014

(30) Foreign Application Priority Data

Oct. 9, 2012 (TW) .............................. 101219563 A

(51) Int. Cl.
*H01P 5/12* (2006.01)
*H04B 1/38* (2006.01)
*H04L 5/08* (2006.01)

(52) U.S. Cl.
CPC ........................................ *H04L 5/08* (2013.01)
USPC ............................. 333/135; 455/90.3; 455/73

(58) Field of Classification Search
USPC ......... 333/124–126, 129, 135, 137; 455/90.3, 455/73
See application file for complete search history.

(56) References Cited

U.S. PATENT DOCUMENTS

| | | | |
|---|---|---|---|
| 7,474,173 B2 * | 1/2009 | Avramis et al. | 333/126 |
| 8,433,257 B2 * | 4/2013 | Laidig et al. | 455/90.3 |
| 8,779,872 B2 * | 7/2014 | Jackson et al. | 333/126 |

* cited by examiner

*Primary Examiner* — Robert Pascal
*Assistant Examiner* — Kimberly Glenn
(74) *Attorney, Agent, or Firm* — Winston Hsu; Scott Margo

(57) ABSTRACT

A radio-frequency transceiver device, used in a wireless communication system, includes a housing; a first printed circuit board, disposed on a first surface of the housing; a second printed circuit board, disposed on a second surface of the housing, for cooperating with the first printed circuit board to process a receive signal; and a waveguide, connected to the housing, having an orthomode transducer, having a common port, for conveying a transmit signal and the receive signal; a first low-pass filter, coupled to a co-polar port of the orthomode transducer; and a diplexer, coupled to a cross-polar port of the orthomode transducer, for cooperating with the first low-pass filter to separate the transmit signal and the receive signal; wherein connection of the housing and the waveguide substantially conforms to an L shape.

10 Claims, 7 Drawing Sheets

RADIO-FREQUENCY TRANSCEIVER DEVICE IN WIRELESS COMMUNICATION SYSTEM

BACKGROUND OF THE INVENTION

1. Field of the Invention

The present invention relates to a radio-frequency transceiver device in a wireless communication system, and more particularly, to a radio-frequency transceiver device for reducing signal bandwidth loss due to a waveguide and achieving waterproofing.

2. Description of the Prior Art

Satellite communication has advantages with huge coverage and no interference caused by a ground environment, and is widely used in military applications, detection and commercial communications services, such as satellite navigation, a satellite voice broadcast system or a satellite television broadcast system. In the prior art, a waveguide is a communication element, which is broadly used in a satellite communication transceiver. For example, the conventional satellite communication transceiver includes an antenna, a waveguide and a transceiver housing, to handle the expected transmit signal or expected receive signal, wherein the waveguide is the main element for conveying wireless signals and separating the wireless signals in two polarization directions, to output the wireless signals in different output ports.

Please refer to FIG. 1, which is a schematic diagram of a radio-frequency transceiver device 10 according to the prior art. The radio-frequency transceiver device 10 includes an antenna 100, a waveguide 102 and a transceiver housing 104. The antenna 100 is used for transmitting a transmit signal and receiving a receive signal. The waveguide 102 is used for conveying and separating the transmit signal and the receive signal, in which the transmit signal and the receive signal can be different in polarization diversity, frequency diversity, time diversity, and so on. The transceiver housing 104 is coupled to the waveguide 102 for executing the relevant signal processes.

However, the waveguide and the transceiver housing are two independent elements so that the waveguide and the transceiver housing should be reassembled and an interface is formed accordingly. Water leakage therefore happens easily. Moreover, in order to reassemble the waveguide and the transceiver housing, the waveguide may be bent and the signal bandwidth loss is further caused. Besides, the conventional waveguide uses the taper design or the clapboard design. But the taper design causes a larger size of the conventional waveguide and the taper design cannot achieve the wideband effects. Therefore, how to reduce the signal bandwidth loss due to the waveguide becomes a goal in the industry.

SUMMARY OF THE INVENTION

The present invention therefore provides a radio-frequency transceiver device, to reduce signal bandwidth loss due to a waveguide and achieve waterproofing.

A radio-frequency transceiver device, used in a wireless communication system, is disclosed. The radio-frequency transceiver device comprises a housing; a first printed circuit board, disposed on a first surface of the housing; a second printed circuit board, disposed on a second surface of the housing, for cooperating with the first printed circuit board to process a receive signal; and a waveguide, connected to the housing, comprising an orthomode transducer, comprising a common port, for conveying a transmit signal and the receive signal; a first low-pass filter, coupled to a co-polar port of the orthomode transducer; and a diplexer, coupled to a cross-polar port of the orthomode transducer, for cooperating with the first low-pass filter to separate the transmit signal and the receive signal; wherein connection of the housing and the waveguide substantially conforms to an L shape.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
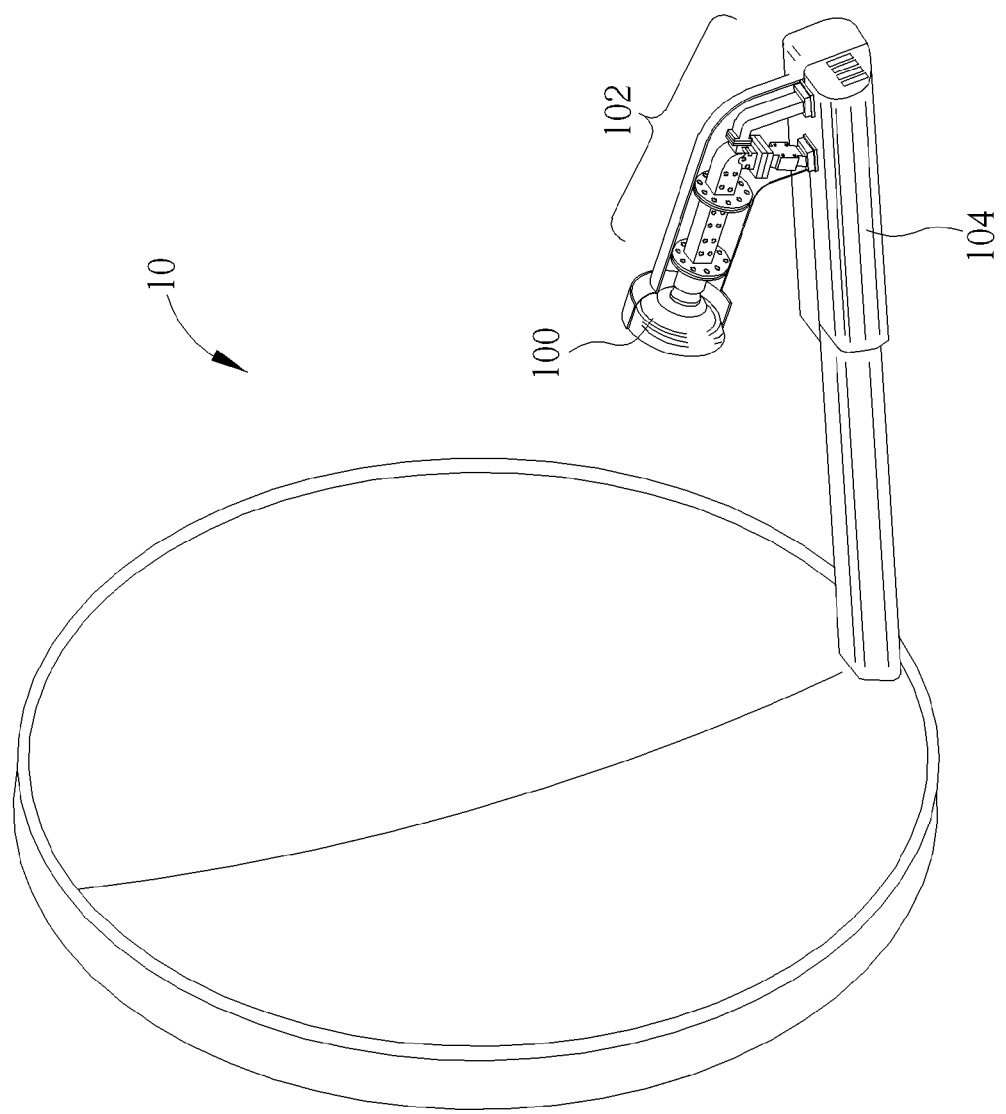
FIG. 1 is a schematic diagram of a radio-frequency transceiver device according to the prior art.
Figure 2:
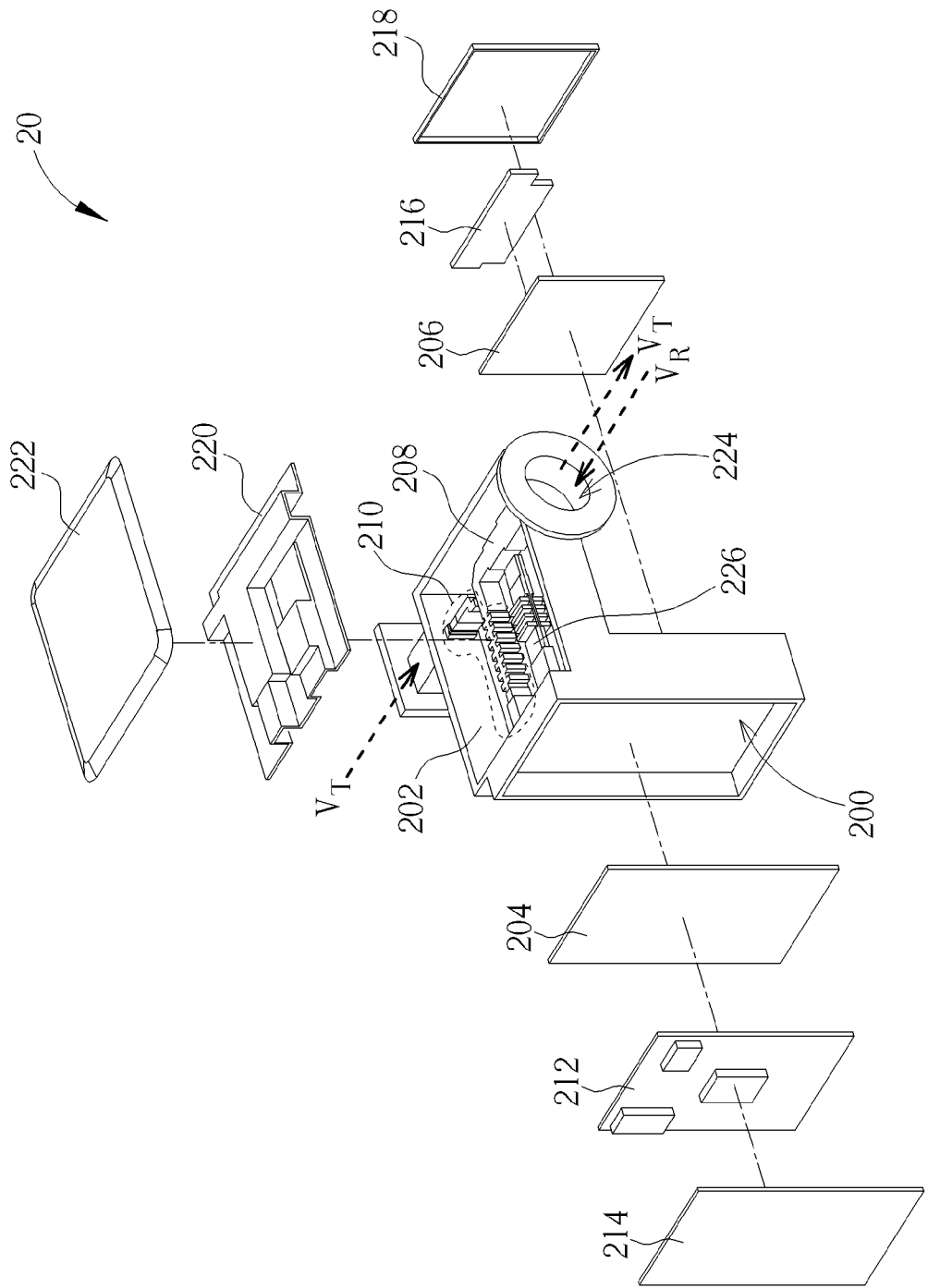
FIG. 2 is a schematic diagram of a radio-frequency transceiver device according to an exemplary embodiment of the present invention.

Please refer to FIG. 2, which is a schematic diagram of a radio-frequency transceiver device 20 according to an exemplary embodiment of the present invention. The radio-frequency transceiver device 20 is used in a wireless communication system such as a satellite voice broadcast system or a satellite television broadcast system. The radio-frequency transceiver device 20 is comprises a housing 200 and a waveguide 202. The housing 200 and the waveguide 202 substantially connect with each other in vertical and form a piece. In other words, the connection of the housing 200 and the waveguide 202 substantially conforms to an L shape and no connecting interface exists between the housing 200 and the waveguide 202. The radio-frequency transceiver device 20 further includes a first printed circuit board 204 and a second printed circuit board 206, respectively disposed on two opposite surfaces of the housing 200, for cooperating with each other to process a receive signal $V_R$. The waveguide 202 includes an orthomode transducer 208, a first low-pass filter 226 and a diplexer 210. The orthomode transducer 208 includes a common port 224 for conveying a transmit signal $V_T$ and the receive signal $V_R$. The first low-pass filter 226 is coupled to a co-polar port of the orthomode transducer 208 (which will be explained in conjunction with FIG. 4). The diplexer 210 is coupled to a cross-polar port of the orthomode transducer 208 (which will be explained in conjunction with FIG. 4), for cooperating with the first low-pass filter 226 to separate the transmit signal $V_T$ and the receive signal $V_R$. In addition, the radio-frequency transceiver device 20 further includes a first clapboard 212, a second clapboard 216, a first protection cover 214, a second protection cover 218, a waveguide top cover 220 and a waveguide protection cover 222. The first clapboard 212 covers the first printed circuit board 204 and the first protection cover 214 covers the first clapboard 212. Moreover, the second clapboard 216 covers the second printed circuit board 206 and the second protection cover 218 covers the second clapboard 216. The waveguide top cover 220 covers a surface of the waveguide 202 so as to form a complete waveguide. The waveguide protection cover 222 further covers the waveguide top cover 220.

In brief, in order to prevent water leakage due to the reassembling operations for the waveguide and the housing and even the signal bandwidth loss due to the bent waveguide caused by the reassembling operations, the housing 200 and the waveguide 202 in the exemplary embodiment of the present invention connect with each other in the L shape and form one piece, so that the waveguide 202 is not bent due to the reassembling operations. Besides, the first printed circuit board 204 and the second printed circuit board 206 can be also disposed on the two opposite surfaces of the housing 200. Therefore, the signal bandwidth loss is reduced and two circuit required oscillators with different oscillating frequencies can be respectively set on the first clapboard 212 and the second clapboard 216 to prevent the spurious interference accordingly. Besides, two sides of the housing 200 and a top of the waveguide 202 are covered with the protection covers, to prevent water leakage problems due to connecting interfaces between elements.

Figure 3:
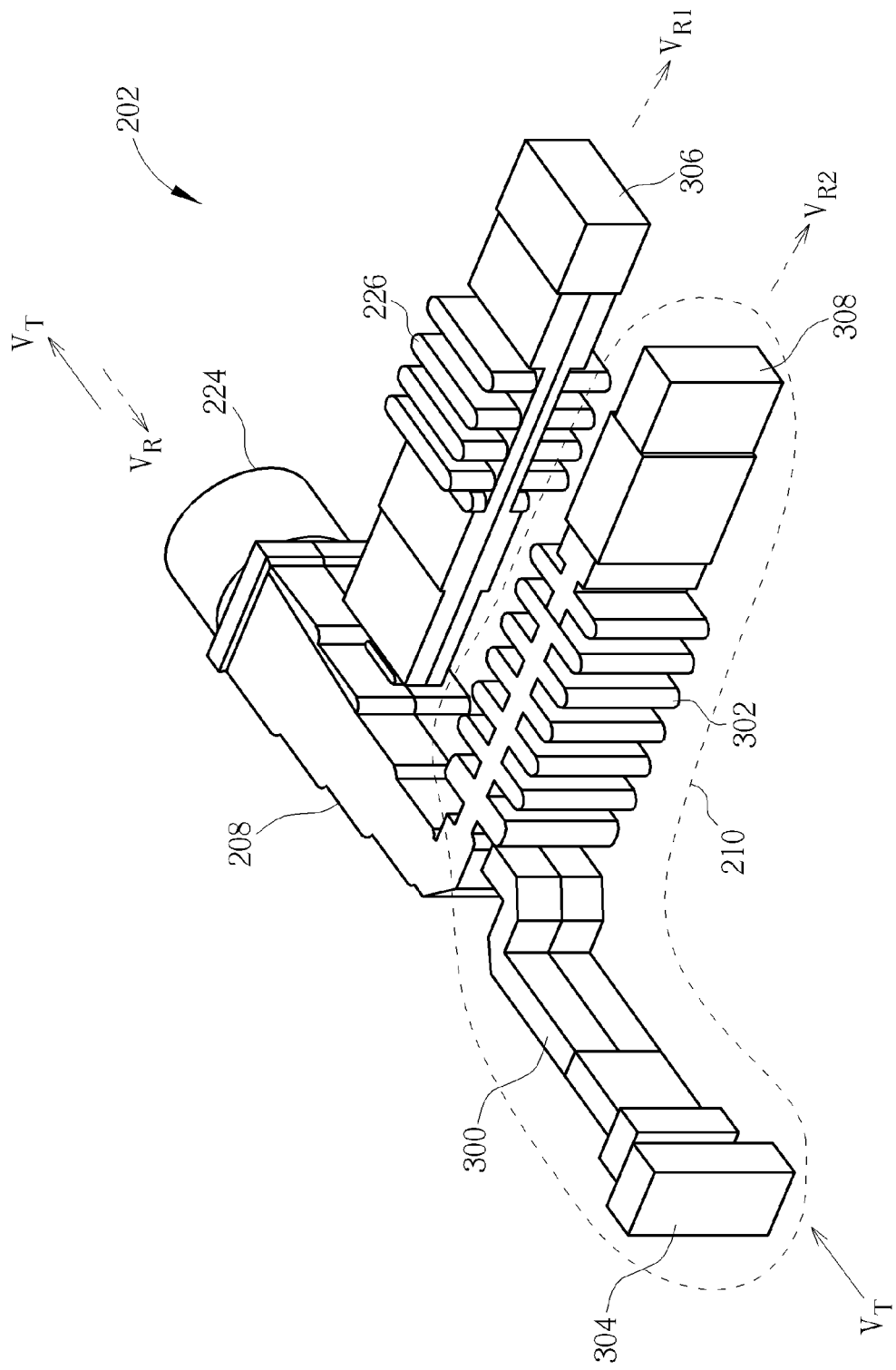
FIG. 3 is a schematic diagram of the detailed structure of the waveguide in FIG. 2.

Please refer to FIG. 3, which is a schematic diagram of the detailed structure of the waveguide 202 in FIG. 2. As shown in FIG. 3, the waveguide 202 includes the othomode transducer 208, the first low-pass filter 226 and the diplexer 210. The othomode transducer 208 is used for separating the co-polar receive signal $V_{R1}$ of the receive signal $V_R$, the cross-polar receive signal $V_{R2}$ of the receive signal $V_R$ and the transmit signal $V_T$. The first low-pass filter 226 is used for filtering out the transmit signal $V_T$, filtering the co-polar receive signal $V_{R1}$ and outputting the co-polar receive signal $V_{R1}$ via a first receive port 306. Besides, the diplexer 210 includes a high-pass filter 300 and a second low-pass filter 302. The high-pass filter 300 is used for filtering out the receive signal $V_R$ and conveying the transmit signal $V_T$ to the othomode transducer 208 via a transmit port 304. The second low-pass filter 302 is also used for filtering out the transmit signal $V_T$. The main difference between the first and second low-pass filter 226 and 302 is that the second low-pass filter 302 is used for filtering the cross-polar receive signal $V_{R2}$ of the receive signal $V_R$ and outputting the cross-polar receive signal $V_{R2}$ via a second receive port 308. Therefore, the co-polar receive signal $V_{R1}$ and the cross-polar receive signal $V_{R2}$ of the receive signal $V_R$ can be outputted to the first and second printed circuit boards 204 and 206 via the first receive port 306 and the second receive port 308 respectively, to perform subsequent signal processes.

Figure 4:
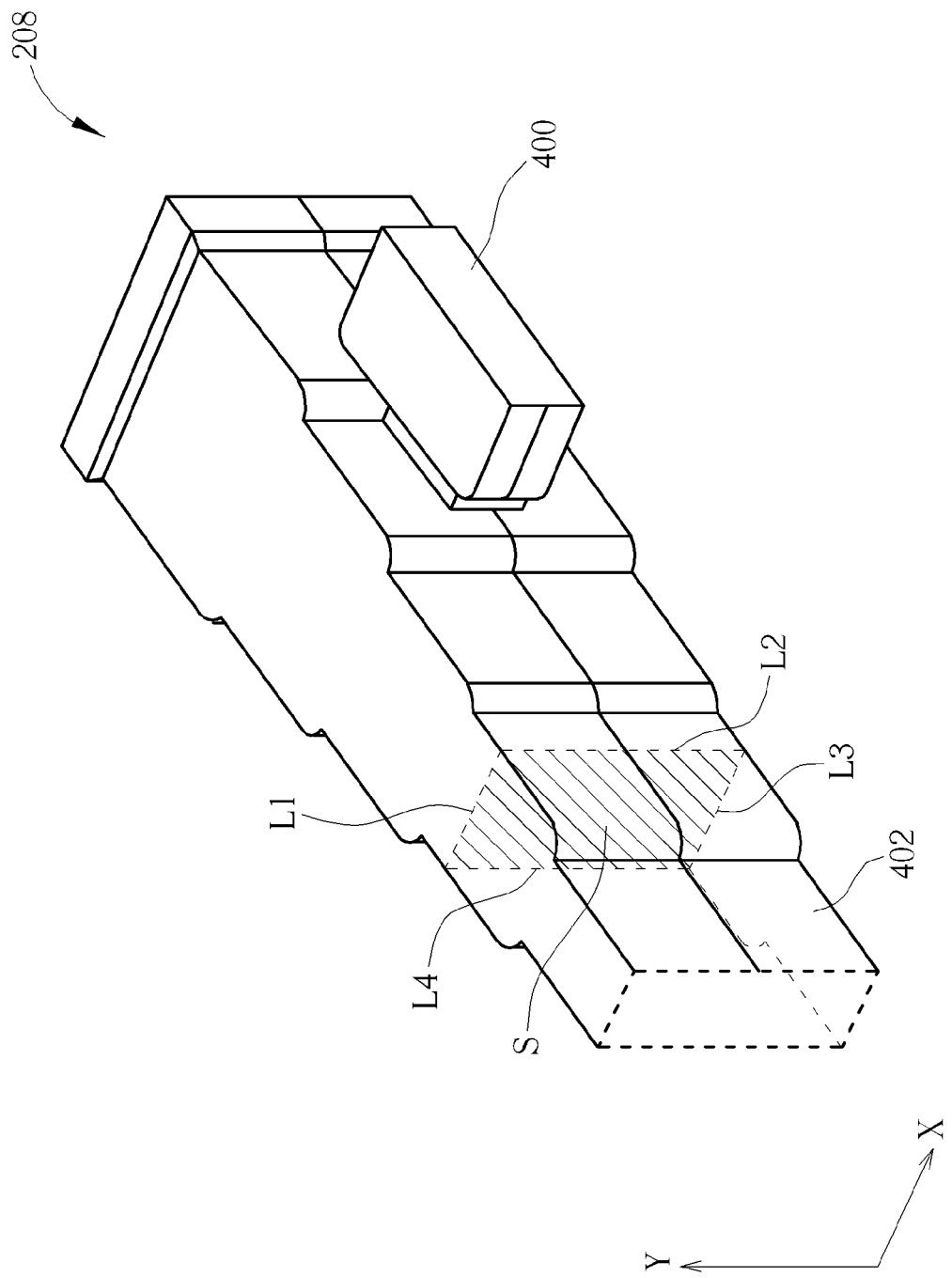
FIG. 4 is a schematic diagram of the orthomode transducer in FIG. 2.

In addition, the orthomode transducer 208 substantially forms a cuboid, as shown in FIG. 4. The width of the orthomode transducer 208 is tapped in steps and the length and the height do not vary with the width. In other words, on a surface S of the orthomode transducer 208, a first edge L1 and a third edge L3 paralleled in a horizontal direction X is tapered in steps, and a second edge L2 and a fourth edge L4 paralleled in a vertical direction Y is not changed. Besides, the orthomode transducer 208 includes a co-polar port 400 and a cross-polar port 402. The orthomode transducer 208 can output the co-polar receive signal $V_{R1}$ to the first low-pass filter 226 via the co-polar port 400. The orthomode transducer 208 can also output the cross-polar receive signal $V_{R2}$ to the diplexer 210 and convey the transmit signal $V_T$ to the orthomode transducer 208 via the cross-polar port 402.

Figure 5:
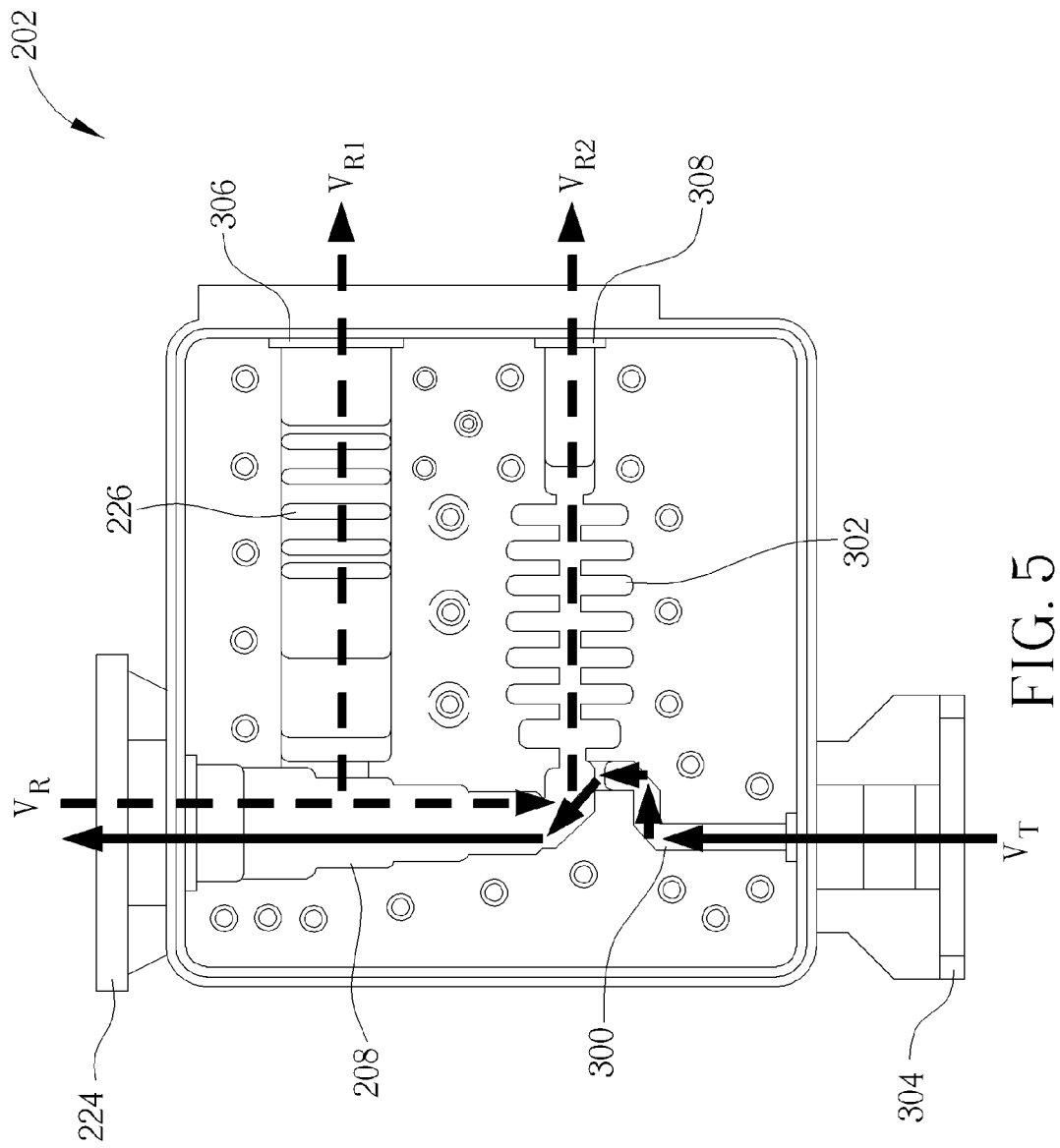
FIG. 5 is a schematic diagram of the operations of the waveguide in FIG. 3.

The operations of the radio-frequency transceiver device 20 are well known by those skilled in the art, so the operations of the radio-frequency transceiver device 20 are partitioned into the transmitting operations and the receiving operations and simply explained with FIG. 5. For the transmitting operations, the radio-frequency transceiver device 20 conveys the transmit signal $V_T$ to the orthomode transducer 208 via the transmit port 304 and the high-pass filter 300 and guides the transmit signal $V_T$ to the common port 224 correctly. The first and second low-pass filters 226 and 302 prevent the transmit signal $V_T$ from entering the first and second receive ports 306 and 308. For the receiving operations, the radio-frequency transceiver device 20 conveys the receive signal $V_R$ to the orthomode transducer 208 via the common port 224 and further guides the co-polar receive signal $V_{R1}$ and the cross-polar receive signal $V_{R2}$ of the receive signal $V_R$ respectively to the first and second low-pass filters 226 and 302 via the orthomode transducer 208. The radio-frequency transceiver device 20 follows to filter the co-polar receive signal $V_{R1}$ and the cross-polar receive signal $V_{R2}$ of the receive signal $V_R$ via the first and second low-pass filters 226 and 302 and outputs the co-polar receive signal $V_{R1}$ and the cross-polar receive signal $V_{R2}$ to the first and second printed circuit boards 204 and 206 via the first and second receive ports 306 and 308, to perform the subsequent signal processes.

Figure 6:
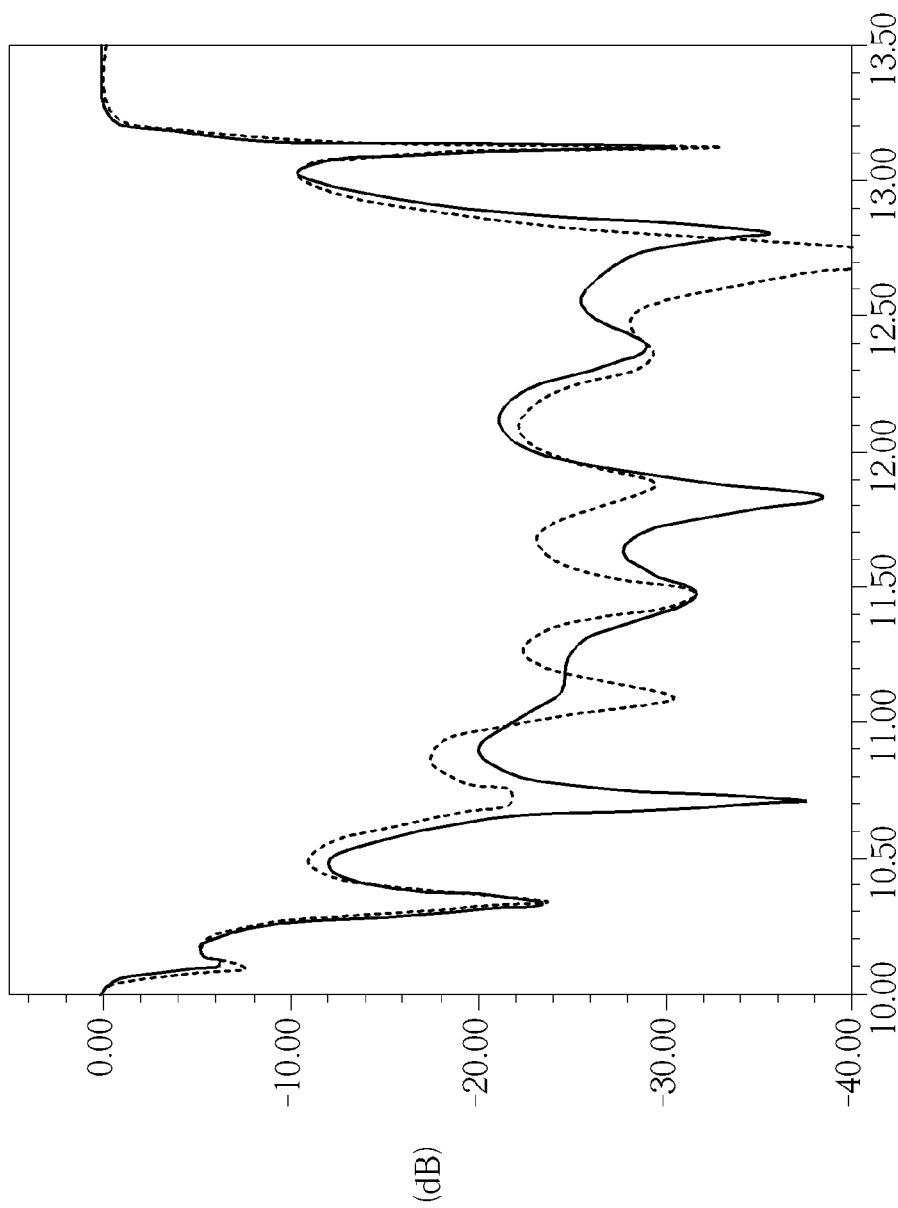
FIG. 6 is a schematic diagram of the return loss bandwidth of the reception terminal of the orthomode transducer in the waveguide in FIG. 3 and that in the conventional waveguide.

Please refer to FIG. 6, which is a schematic diagram of the return loss bandwidth of the reception terminal of the orthomode transducer in the waveguide 202 in FIG. 3 and that in the conventional waveguide. The solid line in FIG. 6 is a curve for the return loss bandwidth of the reception terminal of the orthomode transducer 208 of the waveguide 202; the dotted line is that of the conventional waveguide. As shown in FIG. 6, the bandwidth efficiency of the orthomode transducer 208 can reach 18.7% which is higher than the bandwidth efficiency of the conventional orthomode transducer at 15.5%. Therefore, the waveguide design in the exemplary embodiment of the present invention can reduce the signal bandwidth loss of the orthomode transducer efficiently, to achieve the wideband effects.

Figure 7:
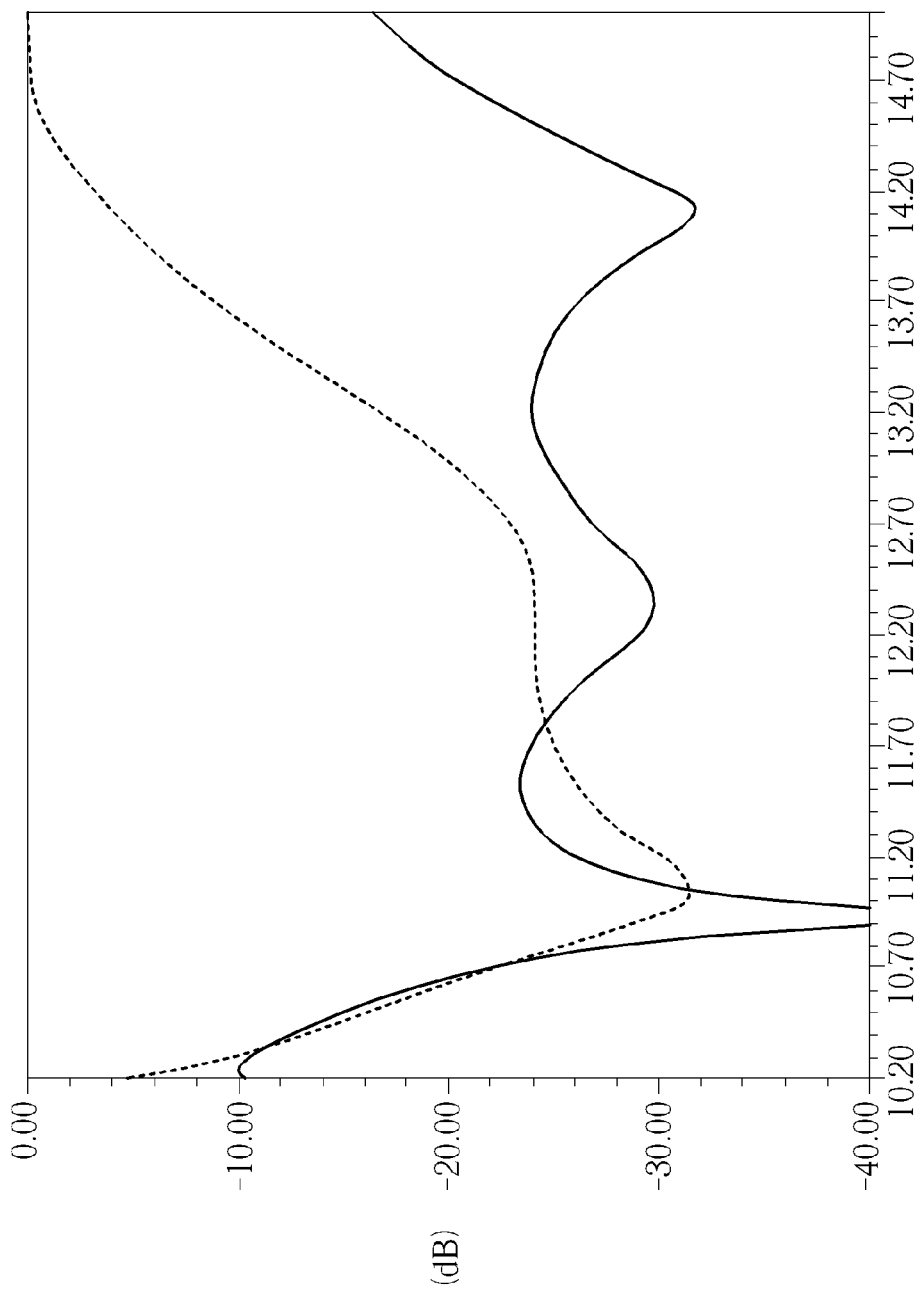
FIG. 7 is a schematic diagram of the return loss bandwidth of the orthomode transducer in FIG. 4.

Please further refer to FIG. 7, which is a schematic diagram of the return loss bandwidth of the orthomode transducer 208 in FIG. 4. The orthomode transducer 208 is performed by a 3-order stepped orthomode transducer. In FIG. 7, the solid line is a curve for the return loss bandwidth of the cross-polar port 402 of the orthomode transducer 208; the dotted line is a curve for the return loss bandwidth of the co-polar reception terminal of the orthomode transducer 208. As shown in FIG. 7, when the return loss of the 3-order stepped orthomode transducer 208 is −20 dB, the bandwidth efficiency reaches 32%, so that the stepped design can reduce the signal bandwidth loss of the orthomode transducer efficiently, to achieve the wideband effects.

In brief, in order to prevent the large size of the orthomode transducer of the waveguide and no wideband effects, the orthomode transducer 208 in the exemplary embodiment of the present invention uses a 3-order stepped structure so that the size and the signal bandwidth loss of the orthomode transducer can be reduced efficiently, to achieve the wideband effects.

Note that, the radio-frequency transceiver device 20 is an example of the present invention, and those skilled in the art can readily make combinations, modifications and/or alterations to the abovementioned description and examples. For example, the orthomode transducer 208 can be performed by the 3-order stepped orthomode transducer or replaced by other orthomode transducer with a different order. In another aspect, the connecting angle of the housing 200 and the waveguide 202 is substantially 90 degree and the main goal is not to bend the waveguide. Therefore, in the purpose, the connecting angle of the housing 200 and the waveguide 202 can be adjusted to an angle larger or smaller than 90 degree according to the user's requirement but not limited herein. Besides, the first protection covers 214 and 218 and the waveguide protection cover 222 can be performed by metal elements.

In the prior art, the waveguide and the housing are reassembled, which causes the water leakage or even bends the waveguide so as to lose the signal bandwidth. Moreover, the conventional waveguide uses the taper design or the clapboard design, which causes a larger size of the conventional waveguide or no wideband effects. In comparison, the present invention connects the waveguide and the housing in the L shape. Therefore, the waveguide is not bent and the signal bandwidth loss is reduced accordingly. Moreover, the used printed circuit board can be partitioned into two boards and disposed on two surfaces of the housing so as to separate two local oscillators with different oscillating frequencies to prevent the spurious interference. Besides, the present invention uses the stepped orthomode transducer to perform the waveguide, so that the size of the waveguide is reduced and the signal bandwidth loss is further reduced. In addition, the present invention forms the radio-frequency transceiver device in one piece and disposes the protection covers outside, to achieve waterproofing.

To sum up, the waveguide is not bent via a connecting way of the L shape and one piece, to reduce the signal bandwidth loss and prevent conventional problems about the water leakage in connecting interfaces between the waveguide and orthomode transducer. The two printed circuit boards can also be disposed on two surfaces of the housing, to separate the two local oscillators with different oscillating frequencies to prevent the spurious interference. Besides, the protection covers are used for covering the outside of the radio-frequency transceiver device so as to prevent the water leakage in the waveguide. Therefore, the radio-frequency transceiver device of the present invention can reduce the signal bandwidth loss and achieve waterproofing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio-frequency transceiver device, used in a wireless communication system, comprising:
   a housing;
   a first printed circuit board, disposed on a first surface of the housing;
   a second printed circuit board, disposed on a second surface of the housing, for cooperating with the first printed circuit board to process a receive signal; and
   a waveguide, connected to the housing, comprising:
      an orthomode transducer, comprising a common port, for conveying a transmit signal and the receive signal;
      a first low-pass filter, coupled to a co-polar port of the orthomode transducer; and
      a diplexer, coupled to a cross-polar port of the orthomode transducer, for cooperating with the first low-pass filter to separate the transmit signal and the receive signal;
   wherein connection of the housing and the waveguide substantially conforms to an L shape.

2. The radio-frequency transceiver device of claim 1, wherein the housing and the waveguide form one piece.

3. The radio-frequency transceiver device of claim 1, wherein the orthomode transducer substantially forms in a cuboid.

4. The radio-frequency transceiver device of claim 1, wherein a surface the orthomode transducer which is vertical to a transmission direction of the receive signal comprises a first edge and a third edge in a horizontal direction and a second edge and a fourth edge in a vertical direction, wherein the first edge and the third edge is tapered in steps along the transmission direction of the receive signal.

5. The radio-frequency transceiver device of claim 4, wherein the second edge and the fourth edge is not tapered along the transmission direction of the receive signal.

6. The radio-frequency transceiver device of claim 1, wherein the first low-pass filter is utilized for filtering out the transmit signal, filtering a co-polar receive signal of the receive signal and outputting the co-polar receive signal via a first receive port.

7. The radio-frequency transceiver device of claim 1, wherein the diplexer comprises:
   a high-pass filter, utilized for filtering out the receive signal and transmitting the transmit signal via a transmit port; and
   a second low-pass filter, utilized for filtering out the transmit signal, filtering a cross-polar receive signal of the receive signal and outputting the cross-polar receive signal via a second receive port.

8. The radio-frequency transceiver device of claim 1, further comprising a first clapboard and a first protection cover, wherein the first clapboard covers the first printed circuit board and the first protection cover covers the first clapboard.

9. The radio-frequency transceiver device of claim 1, further comprising a second clapboard and a second protection cover, wherein the second clapboard covers the second printed circuit board and the second protection cover covers the second clapboard.

10. The radio-frequency transceiver device of claim 1, further comprising a waveguide top cover and a waveguide protection cover, wherein the waveguide top cover covers a surface of the waveguide and the waveguide protection cover covers the waveguide top cover.

* * * * *